United States Patent
Cornet et al.

(10) Patent No.: US 8,732,332 B2
(45) Date of Patent: May 20, 2014

(54) CONTENT SWITCHING WITH USER-DEFINED POLICIES

(75) Inventors: Jerome Cornet, Ottawa (CA); Gerard Damm, Ottawa (CA)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 10/715,425

(22) Filed: Nov. 19, 2003

(65) Prior Publication Data

US 2005/0108428 A1 May 19, 2005

(51) Int. Cl.
*G06F 15/173* (2006.01)
*H04L 12/56* (2006.01)

(52) U.S. Cl.
CPC .................................. *H04L 49/355* (2013.01)
USPC ........................................................ 709/238

(58) Field of Classification Search
USPC ........................................................ 709/238
See application file for complete search history.

(56) References Cited

U.S. PATENT DOCUMENTS

| | | | |
|---|---|---|---|
| 6,459,682 B1 * | 10/2002 | Ellesson et al. | 370/235 |
| 6,591,260 B1 * | 7/2003 | Schwarzhoff et al. | 707/2 |
| 6,629,149 B1 * | 9/2003 | Fraser et al. | 709/245 |
| 2002/0023172 A1 | 2/2002 | Gendron | |
| 2002/0120582 A1 * | 8/2002 | Elston et al. | 705/64 |
| 2003/0028654 A1 * | 2/2003 | Abjanic et al. | 709/229 |
| 2003/0097485 A1 * | 5/2003 | Horvitz et al. | 709/313 |
| 2003/0120817 A1 | 6/2003 | Ott | |

OTHER PUBLICATIONS

"The Java Tutorial: The switch Statement." Sun Microsystems. Archived by the Internet Archive on Mar. 1, 2000: <http://web.archive.org/web/20000301130020/java.sun.com/docs/books/tutorial/java/nutsandbolts/switch.html>. pp. 1-3.*
Fallside, David. "XML Schema Part 0: Primer." May 2, 2001, W3C: <http://www.w3.org/TR/2001/REC-xmlschema-0-20010502/>.*

* cited by examiner

*Primary Examiner* — Christopher Biagini
(74) *Attorney, Agent, or Firm* — Kramer & Amado, P.C.

(57) ABSTRACT

A frame work to build and use a generic content switch is provided. The applications and the routing policy for the content switch are provided by the application provider. The content switch, however, is managed by a network provider so that there is a clear separation of the switching action and the switching policy. The basic framework consists of two key elements; a content switch and a user-defined application that also contains the switching policy.

11 Claims, 2 Drawing Sheets

Content switching application: server farm

Content switching application: server farm

An existing web switch protocol architecture

An XML-aware content switch protocol architecture

Server farm application with XACS

CONTENT SWITCHING WITH USER-DEFINED POLICIES

FIELD OF THE INVENTION

This invention relates to computer based communication systems and more particularly to content switching in communications systems.

BACKGROUND

Basic computer based communications systems rely on a network management entity to route and control the flow of traffic through the system. In some cases nodes within the network have resources which determine a route from the node to the next element in the connection. The routing of the communications is based on the physical topology of the network and the policies determined by the network operator. In packet-based networks, each packet contains a routing information (the destination address in the case of IP networks), and the router matches this routing information against is policy and routing topology information to make the forwarding decision.

Content switches are currently being developed for web based communications over the Internet or other IP-based communication networks. These switches are known as being "content aware" and have the ability to recognize the content being requested, where it is located, and how to route individual content requests to the server best able to manage them. Basically, a content switch is a router that makes routing or quality of service decisions based on the content of the packets in the traffic flow rather than on pure routing information. For example, a web switch, a content switch, is capable of understanding the HTTP traffic and redirects it to the appropriate web server. A classic application of such a system is a server farm, as shown in FIG. 1, and will be used as a reference throughout this application.

Web switches presently available are used to make switching decisions based on HTTP traffic. There is a trend, however, to use extensible mark up language (XML) over HTTP based protocols to provide web based applications such as Microsofts.Net framework. Simple object access protocol (SOAP) is an example of an XML over HTTP based protocol.

Active networks, in which the user has the ability to dynamically define routing policies, are also under development. A context type switch may be used in an active network wherein the full routing policy is provided along with the packets sent by the user. Generally, network providers are reluctant to embrace the active network framework in that the architecture lends itself to misuse by untrusted users.

The present invention addresses some of the problems associated with content switches. Current web switches have many drawbacks, one being that they are too dependent on the evolution of the protocol itself. For example, when the standard moved from HTTP1.0 to HTTP1.1 most content switches had to be replaced because they were examining only the first packets of the stream. Even in the context of a fully programmable web switch the evolution of the protocol has to be compensated by a programming effort which might be significant. As a more general note the content switch needs to support all of the applications switched on HTTP, H.323, RTP, etc. This is shown in FIG. 2 which shows a typical protocol stack for a web switch. As mentioned earlier, web based applications are now based on XML making the classification at the HTTP layer insufficiently granular. For the sake of the present application the invention unifies the definition of the application under a common umbrella, for example XML.

Another problem with content switches is that the switching policy has to be defined by the application provider. This means, in practice, that web switches are essentially controlled by the application provider. For active networks, the great flexibility that they allow is often regarded with some caution because of the trust issue that is implied by letting a user specify his own policies.

The present invention allows for a clear separation of the switching action and the switching policy.

SUMMARY OF THE INVENTION

The present invention solves the problems of the prior art in as much as it provides a framework in which a content switch can be managed by a network provider while the applications that will be switched as well as the switching policies are defined by the application provider, a trusted customer of the network provider. The application provider will, typically, define switching policies responsive to individual customer requirements.

Therefore, in accordance with a first aspect of the present invention there is provided a schema stored on a computer-readable medium for use in a computer based communications system. The schema describes the structure of language in which the document is communicated; it includes as well routing rules, which, when accessed to parse a document written in the language described in the schema, provide routing actions to be taken on packets belonging to a traffic flow associated with the document.

In accordance with a second aspect of the present invention there is provided a content switch for use in routing packets in a computer based communications system comprising: an entity capable of parsing a schema document associated with a packet and containing routing rules; and a routing instruction processor to interpret the routing rules in the schema document.

In accordance with a third aspect of the present invention there is provided a method of carrying out content switching in a computer-based communications system comprising: determining a routing action to be taken on packets of a flow associated with a document written according to a schema wherein the determination is made by applying routing rules contained in the schema to elements of the document.

BRIEF DESCRIPTION OF THE DRAWINGS

The invention will now be described in greater detail with reference to the attached drawings wherein.

DETAILED DESCRIPTION OF THE INVENTION

Figure 1:
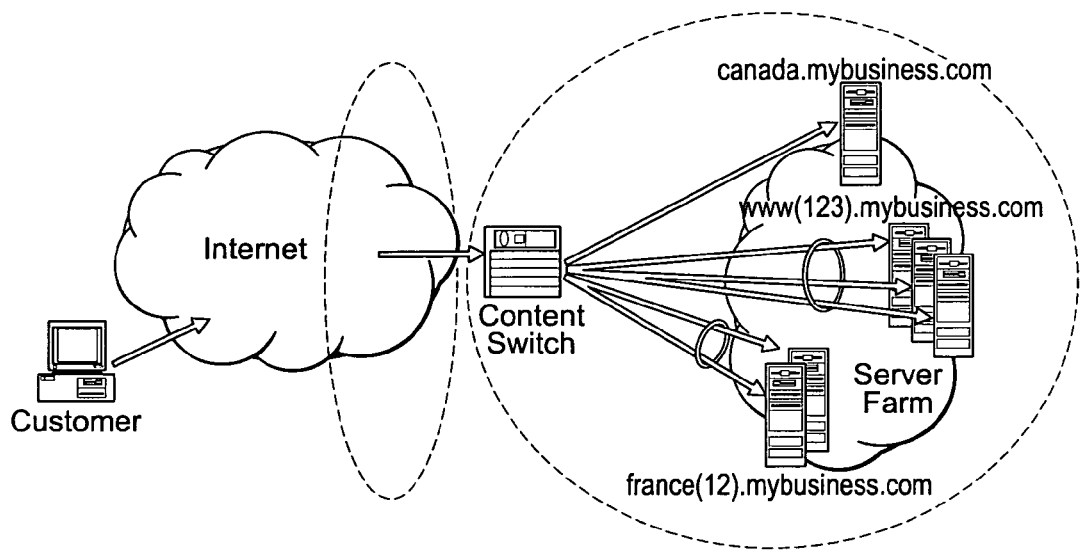
FIG. 1 illustrates a content switching application involving a server farm; The administrative domains are circled: the web switch is in the same administrative domain than the servers running the application
Figure 2:
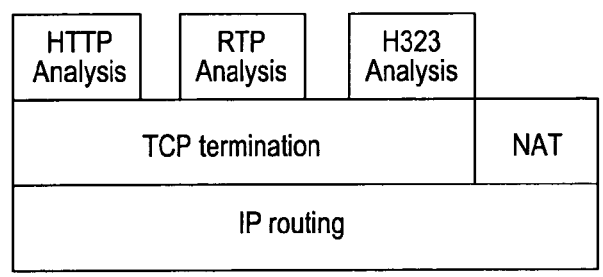
FIG. 2 shows an existing web switch protocol architecture.

The invention relates to a framework that consists of two main elements namely a content switch and a user-defined application that also contains a switching policy. It will be assumed that the present invention is applicable to one architecture such as described in FIG. 1 where the applications, running on the server farm, are based on XML. XML is a framework for defining mark up languages and is designed to separate syntax from semantics so as to provide a common framework for structuring information. In an XML-based application the structure of an XML document is described in its schema. The schema describes how to interpret the XML document.

A schema is a definition of the syntax of an XML based language i.e. a class of XML document and a schema language is a formal language for expressing schemas. Potentially, multiple schema languages are in use i.e. DTD, XSD, DSD etc. but for the purpose of the example, the W3C recommendation XML schema definition is used. The XML schema recommendation features processing instructions which can be used to pass specific information to the parser. These are in the form of XML tags such as <?target data . . . ?>.

An XML parser sometimes referred to as the schema processor is used to check the validity of a document and, if the document is valid, extract the meaningful elements of the document. An XML document may contain reference to the schema it is using so that the schema does not have to be passed along with each document. The XML parser will get the document, retrieve the schema from the reference, and validate the document against the schema.

XML is used in this application as an example but it will be apparent to one skilled in the art that the concept is applicable to many other technologies (HTML CSS, SGML, etc), as described in section [0033].

The first element in the framework of the invention is a content switch which will also be known as an XML aware content switch. It is to be understood that the XML content switch is comparable to a usual web switch that is capable of terminating HTTP sessions, and steering traffic to different servers. This will typically be done using network access translation (NAT) or other known techniques.

To satisfy the objectives of the invention, XML parsing capabilities are added to the content switch. To be able to parse an XML document, each document must contain a reference to its schema (a URI—Universal Resource Identifier—would be used). It will be assumed that the content switch can fetch the schema if necessary.

Figure 3:
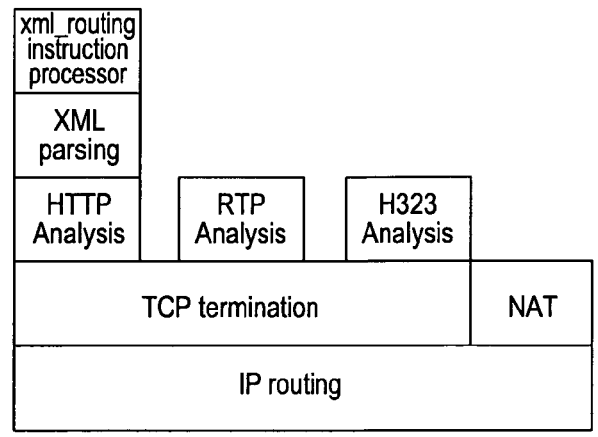
FIG. 3 shows a content aware, content switch protocol architecture according to the present invention.
Figure 4:
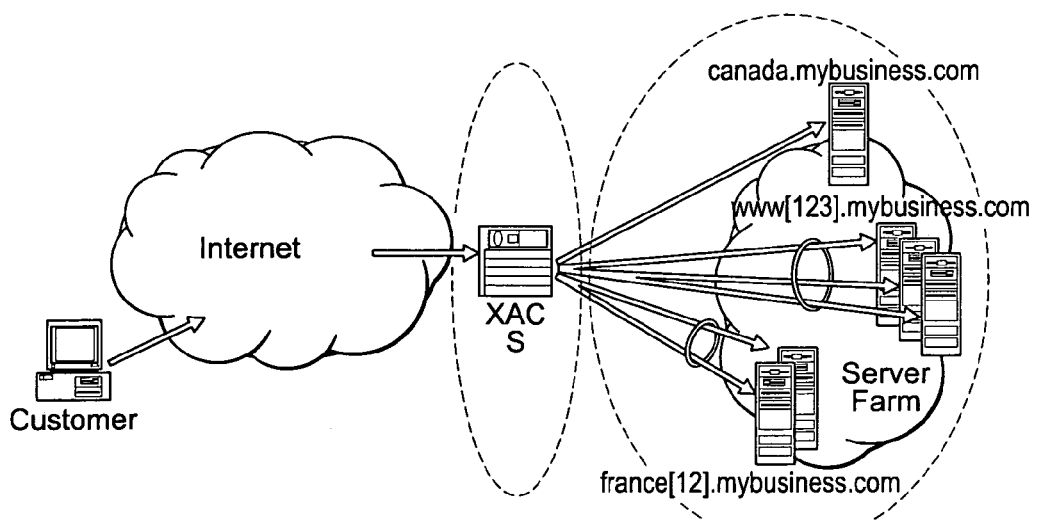
FIG. 4 illustrates a similar application than FIG. 1, this time using a XML-aware content switch and applications; the administrative domains of the XACS and the application servers are distinct.

XML parsers capable of carrying out the parsing step are quite simple to realise because of the simplicity of the language itself. The XML parser will be connected to an XML routing instruction processor that is capable of interpreting the routing rules contained in the policy document. The protocol stack of an XML aware content switch (XACS) is shown in FIG. 3.

Having added parsing capabilities to the XACS the second piece of the invention is to add routing information to the schema. To avoid interfering with the description of the structure, routing information is added as a processing instruction using specific tags, such as <?xml_routing . . . ?>.

The tag contains a list of the routing/quality of service decisions that will be made by the content switch depending on the values of the associated element. These rules are ordered by priority and contain at least:
 an XML element to compare
 a value to compare with; and
 routing/QoS information if the element matches the value.
The rules might also contain a default action in the case the element in analysis does not match against the rules. In that case, if there is no default rule, the routing decision will be left to a usual routing engine (non content-aware).

An example of a schema with a routing rule is shown as follows:

```
<schema xmlns="http://www.w3.org/2001/XMLSchema"
        xmlns:b="http://www.mybusiness.com"
        targetNamespace="http://www.mybusiness.com">
  <element name="card" type="b:card_type"/>
  <element name="name" type="string"/>
  <element name="company" type="string"/>
  <element name="email" type="string"/>
  <element name="phone" type="string"/>
    <element name="country" type ="string"/>
    <complexType name="card_type">
      <sequence>
        <element ref="b:name"/>
        <element ref="b:company"/>
        <element ref="b:email"/>
        <element ref="b:phone" minOccurs="0"/>
        <element ref="b:country" minOccurs="0"/>
      </sequence>
    </complexType>
    <?xml_routing
    if (country = "France") {
        REDIRECT_LOAD_BALANCE (france1.mybusiness.com,
france2.mybusiness.com)
    }
    if (country = "Canada") {
        REDIRECT (canada.mybusiness.com)
    }
    default:
        REDIRECT_LOAD_BALANCE (www1.mybusiness.com,
www2.mybusiness.com, www3.mybusiness.com)
    ?>
</schema>
```

The language of the rules passed to the XML routing instruction processor have to be fully defined but the definition thereof is not part of this invention.

As an example of a service using a content switch there is described an application where a user has to fill in a form that contains his business card and depending on the country where he lives, the contents which will redirect the request to a different server. The aforementioned schema is associated to the business card. The additions to the schema to support the invention are written in bold print in the foregoing example.

The following shows a customer request for the business card:

```
<card xmlns=http://www.mybusiness.com
 xmlns:xsi="http://www.w3.org/2001/XMLSchema-instance"
   xsi:schemaLocation="http://www.mybusiness.com/business_card.xsd">
   <name>John Doe</name>
   <company>Customer Business Inc.</title>
   <email>john.doe@cbinc.com</email>
   <phone>(202) 456-1414</phone>
 <country>Canada</country>
</card>
```

When a packet containing a customer request reaches the XML aware contents which the following happen
 1. The XACS will send the XML document to the XML parser
 2. The XML parser will fetch the schema from the schema location (http://www.mybusiness.com/business_card.xsd). A local cache can be added to speed up the process for subsequent access to the same schema.
 3. The XML parser will validate the XML document according to the schema 4. The XML parser will pass the validated document to the xml_routing instruction processor to get the routing information
5. The xml_routing instruction processor will get the rule according to the schema (in this case the rule will be REDIRECT canada.mybusiness.com)
6. The XACS will redirect the packet to the server canada.mybusiness.com.

By letting the creator of the schema specify the routing policy, the application manager i.e. the creator of the schema, can define better services to its customers while relying on the network provider's contents switch to provide those services. This results in better quality of service and smarter routing, while separating the administrative domains of the content switch on one side and the application servers on the other side.

The concept works naturally with XML based applications because the technology itself contains the necessary enabler i.e. a schema.

While the description herein concentrates on XML it should be noted that:

XML seems to be the standard of choice for future content-based application.

Almost all the derivatives of SGML (as XML is) or any language that features a style sheet can be used in place of XML (which may make the parser more complex).

Even HTML (starting with 4.0) features a style sheet that could be used for the purpose of the invention.

A language that contains comments can also be used to provide such functionality, by putting the reference to the structure and the routing information in specially formatted comments.

So the invention is not limited to XML and is very applicable to most of the languages used in network-based applications.

By shifting the paradigm of content switching, the invention provides a framework in which a content switch can be managed by a network provider, while the applications that will be switched and the switching policies are defined by the application provider, a trusted customer of the network provider. The trust relationship between the network and application providers can be described in a contract, and enforced by an entity in the XACS that checks whether the XML schema describing the routing decision respects the terms of the contract.

The invention enables high added value services to network and application providers and a better management of the cost it provides for:

Better services (more added-value): the routing/QoS is done at the very fine application level.

Reduced capital expenditures for the network provider: only one content switch for all the applications, and might be shared for multiple customers.

Reduced operating expenditures for the network provider: the routing policy is managed by the application.

Reduced capital expenditures for the application provider: no content switch to buy Reduced operating expenditures for the application provider: the policy is now defined per application, each application provider directly managing the policy (instead of a central management on a single content switch).

Adding XML parsing capabilities creates an additional packet processing burden on the content switch. However, this represents a small portion of the overall processing that a content switch already performs.

Although particular embodiments of the invention have been described and illustrated, it will be apparent to one skilled in the art that numerous changes can be made without departing from the basic concept. It is to be understood, however, that such changes will fall within the full scope of the invention as defined by the appended claims.

The invention claimed is:

1. A content switch managed by a network provider that routes packets associated with a document to one of a plurality of application providers, wherein each application provider is a trusted customer, as defined by a contract, of the network provider, in a computer based communications system using instructions recorded on a non-transitory storage medium, the non-transitory storage medium comprising:
instructions in the content switch that send the document to a parser, the document referencing a location of a corresponding schema;
instructions in the parser that fetch the corresponding schema from the location, wherein the fetched schema comprises:
a plurality of elements, wherein a particular element in the fetched schema is also found in the sent document,
a particular routing rule that redirects the packets to a particular server when a value of the particular element in the sent document matches a predefined value of the particular element in the fetched schema, and
a default routing rule that redirects the packets to a default server when the value of the particular element in the sent document does not match the predefined value of the particular element in the fetched schema;
instructions in the parser that validate the sent document according to the fetched schema;
instructions in the parser that pass the validated document to a routing instruction processor;
instructions that interpret the routing rules in the schema, wherein the content switch executes the routing rules;
instructions in the content switch that use the interpreted routing rules to redirect the packets associated with the document to either the particular server or the default server; and
instructions in the content switch that check whether the schema respects terms of the contract.

2. The content switch as recited in claim 1, further comprising:
instructions that parse Extensible Markup Language (XML).

3. The content switch of claim 1, wherein:
the fetched schema comprises a plurality of particular routing rules and a plurality of predefined values of the particular element in the fetched schema,
each of the particular routing rules redirects the packets to a different server, and
each of the particular routing rules corresponds uniquely to one of the predefined values.

4. A method of carrying out content switching for a plurality of application providers in a network provider of a computer-based communications system, wherein each application provider is a trusted customer, as defined by a contract, of the network provider, that uses instructions recorded on a non-transitory storage medium, the medium comprising:
instructions that add parsing capabilities to a content switch;
instructions that add routing rules to a schema associated with packets and a document, wherein the schema comprises:
a plurality of elements, wherein a particular element in the schema is also found in the document, a particular routing rule that redirects the packets to a particular server when a value of the particular element in the document matches a predefined value of the particular element in the schema, and a default routing rule that redirects the packets to a default server when the value of the particular element in the document does not match the predefined value of the particular element in the schema;

instructions that direct the content switch to fetch the schema to determine the routing action to be taken on the packets associated with the document written according to the fetched schema and containing the reference to the fetched schema, wherein the determination is made by applying the routing rules from the schema to elements parsed from the document;

instructions that route the packets according to the determined routing action, wherein each application provider, as the trusted customer of the network provider, defines switching policies, and administrative domains of the content switch and application servers are separated; and instructions that check whether the schema respects terms of the contract.

5. The method as recited in claim 4, further comprising:
instructions that use Extensible Markup Language (XML).

6. The method of claim 4, wherein:
the schema comprises a plurality of particular routing rules and a plurality of predefined values of the particular element in the schema, each of the particular routing rules redirects the packets to a different server, and each of the particular routing rules corresponds uniquely to one of the predefined values.

7. A system that routes traffic to application providers in a network provider of a computer based communications network using instructions recorded on a non-transitory storage medium, wherein each application provider is a trusted customer, as defined by a contract, of the network provider, the medium comprising:

instructions that add parsing capabilities to a content switch;

instructions that add routing rules to a schema associated with packets and a document, wherein the schema comprises:

a plurality of elements, wherein a particular element in the schema is also found in the document, a particular routing rule that redirects the packets to a particular server when a value of the particular element in the document matches a predefined value of the particular element in the schema, and a default routing rule that redirects the packets to a default server when the value of the particular element in the document does not match the predefined value of the particular element in the schema;

instructions that direct the content switch to fetch the schema, interpret the routing rules in the document containing the reference to the schema and written in the language of the schema, and apply the routing rules to elements in the network;

instructions that determine a routing action to be performed on the packets from a packet flow associated with the document, wherein each application provider, as the trusted customer of the network provider, defines switching policies, and administrative domains of the content switch and application servers are separated; and instructions that check whether the schema respects terms of the contract.

8. The system as recited in claim 7, further comprising:
instructions that parse Extensible Markup Language (XML).

9. The system of claim 7, wherein:
the schema comprises a plurality of particular routing rules and a plurality of predefined values of the particular element in the schema, each of the particular routing rules redirects the packets to a different server, and each of the particular routing rules corresponds uniquely to one of the predefined values.

10. A computer program schema comprising instructions stored on a non-transitory storage medium in a network provider of a computer based communications system, the non-transitory medium comprising:

instructions that add parsing capabilities to a content switch;

instructions that add routing rules to a schema associated with packets and a document, wherein the schema comprises:

a plurality of elements, wherein a particular element in the schema is also found in the document, a particular routing rule that redirects the packets to a particular server when a value of the particular element in the document matches a predefined value of the particular element in the schema, and a default routing rule that redirects the packets to a default server when the value of the particular element in the document does not match the predefined value of the particular element in the schema;

instructions that enable a particular application provider to specify the routing rules;

instructions that direct the content switch to fetch the schema to provide routing actions to be taken on the packets associated with the document containing the reference to the schema and written in the language of the schema;

instructions that route the packets to the application providers, wherein each application provider is a trusted customer, as defined by a contract, of the network provider that defines switching policies, and administrative domains of the content switch and application servers are separated; and instructions that check whether the schema respects terms of the contract.

11. The schema of claim 10, wherein:
the schema comprises a plurality of particular routing rules and a plurality of predefined values of the particular element in the schema, each of the particular routing rules redirects the packets to a different server, and each of the particular routing rules corresponds uniquely to one of the predefined values.

* * * * *